United States Patent [19]

Chaudhary et al.

[11] Patent Number: 5,554,661
[45] Date of Patent: Sep. 10, 1996

[54] CLOSED CELL, LOW DENSITY ETHYLENIC POLYMER FOAM PRODUCED WITH INORGANIC HALOGEN-FREE BLOWING AGENTS

[75] Inventors: Bharat I. Chaudhary, Kehl, Germany; Georges Eschenlauer, Soufflenheim, France; Bruce S. Marks, Westerville, Ohio

[73] Assignee: Dow Deutschland Inc., Rheinmuenster, Germany

[21] Appl. No.: 394,117

[22] Filed: Feb. 24, 1995

Related U.S. Application Data

[62] Division of Ser. No. 241,115, May 10, 1994, Pat. No. 5,416,129.

[51] Int. Cl.$^6$ ............................................. C08J 9/12
[52] U.S. Cl. ........................... 521/97; 521/98; 521/142; 521/143
[58] Field of Search .......................... 521/97, 98, 79, 521/143, 142

[56] References Cited

U.S. PATENT DOCUMENTS

| | | |
|---|---|---|
| 3,379,802 | 4/1968 | Raley et al. . |
| 3,491,032 | 1/1970 | Skochdopole et al. . |
| 4,213,925 | 7/1980 | Kiyono et al. . |
| 4,214,054 | 7/1980 | Watanabe et al. . |
| 4,255,368 | 3/1981 | Olabisi . |
| 4,464,484 | 8/1984 | Yoshimura et al. . |
| 4,521,541 | 6/1985 | Rutherford et al. . |
| 4,528,300 | 7/1985 | Park . |
| 4,542,162 | 9/1985 | Rutherford et al. . |
| 4,543,367 | 9/1985 | Rutherford et al. . |
| 4,649,001 | 3/1987 | Nakamura et al. . |
| 4,746,564 | 5/1988 | Shin . |
| 4,761,328 | 8/1988 | Shin . |
| 4,832,770 | 4/1989 | Nojiri et al. . |
| 4,836,814 | 6/1989 | Bambara et al. . |
| 4,925,606 | 5/1990 | Francis et al. . |
| 4,952,352 | 8/1990 | Shin . |

FOREIGN PATENT DOCUMENTS

| | | |
|---|---|---|
| 041380 | 12/1981 | European Pat. Off. . |
| 383498 | 8/1990 | European Pat. Off. . |
| 486920 | 5/1992 | European Pat. Off. . |
| 0602262 | 12/1992 | European Pat. Off. . |

Primary Examiner—Morton Foelak

[57] ABSTRACT

An uncrosslinked, closed cell, low density ethylenic polymer foam having a density of less than 150 kg/m$^3$ is prepared from, for example, uncrosslinked low density polyethylene using inorganic blowing agents, such as carbon dioxide, argon, or mixtures thereof. A process for preparing such uncrosslinked, closed cell, low density ethylenic polymer foam comprising extruding a ethylenic polymer of suitable melt tension using a 100 percent inorganic blowing agent, such as carbon dioxide, argon, or mixtures thereof, and the foams produced with this process are also disclosed.

10 Claims, No Drawings

CLOSED CELL, LOW DENSITY ETHYLENIC POLYMER FOAM PRODUCED WITH INORGANIC HALOGEN-FREE BLOWING AGENTS

CROSS-REFERENCE TO RELATED APPLICATION

This application is a divisional of application Ser. No. 08/241,115, filed May 10, 1994, now U.S. Pat. No. 5,416,129.

BACKGROUND OF THE INVENTION

The present invention relates to thermoplastic, ethylenic polymer foams, more particularly, to closed cell, low density ethylenic polymer foams prepared using inorganic halogen-free blowing agents and to a process for the preparation thereof.

It is well known to prepare ethylenic polymer foams by heat plastifying a normally solid ethylenic polymer, admixing, under heat and pressure, such heat plastified polymer with a volatile organic blowing agent to form a flowable gel, and, thereafter, extruding the gel into a zone of lower pressure and temperature to expand and cool the gel to form the desired solid ethylenic polymer foam product.

A phenomenon frequently encountered in the preparation of ethylenic polymer foams is that of changes in foam dimensions (volume) which occur during the aging or curing period following manufacture. During the aging or curing period, the blowing agent employed gradually diffuses out of the cells in the foam product and air gradually diffuses into the cells in place thereof.

The conventional blowing agents used in the production of these low density ethylenic polymer foams are generally a high percentage, if not entirely, organic blowing agents including fluorocarbons, such as saturated chlorofluorocarbons (CFC's) and hydrochlorofluorocarbons (HCFC's) and other halogenated hydrocarbons. Such chlorofluorocarbons are suspected of destroying the earth's protective ozone layer. Non-halogenated hydrocarbons may also be employed as blowing agents. The non-halogenated hydrocarbons do not damage the ozone layer, but are highly flammable.

Due to increased environmental concerns about ozone depletion, greenhouse effects and air quality in general, large efforts are being made to replace CFC's, HCFC's and other halogenated hydrocarbons currently used as blowing agents in the foam industry with environmentally more acceptable blowing agents. Most of the replacements are the non-halogenated hydrocarbons (sometimes in mixtures with carbon dioxide), but these still present hazards during foam manufacture as well as during application and/or fabrication due to their high flammabilities.

One potential alternative that has been considered and evaluated is the use of inorganic blowing agents, such as carbon dioxide or argon, as the sole blowing agents. However, compared with the conventional blowing agents, both carbon dioxide and argon present numerous difficulties due to their relatively low solubilities in the ethylenic polymer, low heats of vaporization and, in the case of carbon dioxide, high permeability through ethylenic polymers. Hence, previous ethylenic polymer foams produced with carbon dioxide or argon as the sole blowing agent have been restricted to sheet products and/or foams having densities greater than 150 kg/m$^3$, and mostly in sheet form.

Lower foam densities were only achieved by crosslinking to obtain adequate melt strength to prevent cell collapse during the foam expansion. However, crosslinked foams cannot be recycled, hence, they are environmentally less accepted.

Therefore, it is still highly desirable to develop techniques of using blowing agents which have the potential for less environmental damage and which are non-flammable and which result in ethylenic polymer foams having properties as close as possible to those prepared with conventional blowing agents. More particularly, it is highly desirable to provide ethylenic polymer foams having densities below 150 kg/m$^3$ which have been blown with carbon dioxide as the single blowing agent, without the need of crosslinking.

SUMMARY OF THE INVENTION

Accordingly, this invention accomplishes such an improvement by producing an uncrosslinked, low density, closed cell ethylenic polymer foam, from, for example, polyethylene, using a blowing agent that is environmentally acceptable and not flammable, without the need for crosslinking. In a first aspect, the present invention is an uncrosslinked, low density ethylenic polymer foam prepared from a foaming composition comprising an ethylenic polymer having a melt index of less than about 25 grams per 10 minutes (g/10 min) and a melt tension between about 2.0 grams (g) and about 8.5 g and an inorganic halogen-free blowing agent.

The term "low density foam", as used herein, is meant to define foams having a density of less than about 150 kg/m$^3$.

In a second aspect, the present invention is a process for making an uncrosslinked, closed cell, low density ethylenic polymer foam comprising the steps of a) heating an ethylenic polymer having a melt index of less than about 25 grams per 10 minutes and a melt tension between about 2.0 g and about 9.0 g to form a polymer melt;

b) incorporating into the polymer melt an inorganic halogen-free blowing agent to form a foamable gel;

c) cooling the foamable gel to a temperature appropriate for the expansion of a low density ethylenic polymer foam, and d) extruding the foamable gel through a die to form the foam.

Surprisingly, it has been discovered that by using ethylenic polymers, especially low density polyethylene, exhibiting melt index and melt tension within the above-identified values, uncrosslinked, closed cell ethylenic polymer foams having densities of less than about 150 kg/m$^3$ can be obtained using carbon dioxide or argon as the sole blowing agent or using mixtures of carbon dioxide and argon as the blowing agent. It has also been discovered that when using uncrosslinked, low density polyethylene polymers and carbon dioxide or argon as the sole blowing agent, in a continuous extrusion process, foams in a board or plank shape with a thickness above 10 millimeters (mm) at densities as low as about 50 kg/m$^3$ can be produced.

DETAILED DESCRIPTION OF THE INVENTION

Ethylenic polymers suitable for use in the present invention include uncrosslinked polyethylene polymers, preferably uncrosslinked low density polyethylene polymers, ethylene-vinyl acrylate copolymers, and ethylene-acrylic acid copolymers. Preferred ethylenic polymers are uncrosslinked polyethylene polymers exhibiting sufficient melt strength to withstand foam collapse tendencies during the expansion stage; this compensates for the inadequate gel cooling due to the low molar heat of vaporization (cal/gmol) of carbon dioxide.

The term "low density polyethylene polymer", as used herein, is meant to define polyethylene polymers having a density or less than about $0.930$ g/cm$^3$.

Representative ethylenic polymers include uncrosslinked polyethylene polymers such as, for example, low density polyethylene polymers having a melt index (as measured according to ASTM D 1238) of less than about 25 g/10 min, preferably between about 1.0 g/10 min and about 15 g/10 min, and most preferably between about 1.5 g/10 min and about 6 g/10 min; and a melt tension (measured at 190° C. with a 2.16 kg weight and 60 rpm) between about 2.0 g and about 9.0 g, preferably between about 3.0 g and about 8.5 g, and most preferably between about 3.0 g and about 8.0 g. In the case of ethylene homopolymers, the polymers include those having a density (as measured according to ASTM D 1505) of about 0.916 g/cm$^3$ to about 0.930 g/cm$^3$, preferably about 0.920 g/cm$^3$ to about 0.926 g/cm$^3$ and most preferably about 0.920 g/cm$^3$ to about 0.924 g/cm$^3$.

In the case of ethylenic polymers other than polyethylene polymers being employed, the polymer densities can be greater than 0.930 g/cm$^3$.

As has been noted, an important feature of the present invention is the use of an inorganic halogen-free blowing agent which comprises carbon dioxide, argon, or mixtures of carbon dioxide with argon. One preferred embodiment of the present invention employs carbon dioxide used as the sole blowing agent. When carbon dioxide is employed as the sole blowing agent, lower foam densities can be achieved than by using argon, alone or in combination with carbon dioxide.

In preparing the uncrosslinked closed cell, low density ethylenic polymer foam of the present invention, the blowing agent may be supplied to the ethylenic polymer in any conventional manner. For example, the blowing agent may be directly injected into the heat plastifying and mixing apparatus such as an extruder.

It is to be noted that such inorganic blowing agents do not harm the atmosphere nor are they flammable whereas the current use of other blowing agents is harmful to the atmosphere and/or flammable. It is surprising that this particular blowing agent, i.e. carbon dioxide alone, works as well as it does in the manufacture of uncrosslinked low density polyethylene foams since the prior art, such as the article entitled "Influence of the Type of Physical Blowing Agent on the Process of Foam Formation from Polyethylene Melt", by V. P. Kudryashov et al., *International Polymer Science and Technology*, Vol. 14, 1987, teaches that the lower density limit achievable with carbon dioxide as the sole blowing agent is about 180 kg/m$^3$.

The uncrosslinked, closed cell polyethylene foams prepared in accordance to the present invention exhibit densities as low as about 50 kg/m$^3$, with the foams more typically having a preferred density of at least about 65 kg/m$^3$ and less than about 150 kg/m$^3$, and most preferably in the range of about 100 kg/m$^3$ to about 150 kg/m$^3$. The foam cells of the foams prepared according to the present invention contain carbon dioxide, argon or a mixture of carbon dioxide and argon when initially formed.

The preparation of closed cell ethylenic polymer foams in accordance with the present invention is most conveniently done in a manner generally as shown and described in U.S. Pat. No. 2,669,751, wherein the blowing agent is injected into a heat-plastified polymer stream within an extruder. From the extruder the heat-plastified gel is passed into a mixer, the mixer being a rotary mixer wherein a studded rotor is enclosed within a housing which has a studded internal surface which intermeshes with the studs on the rotor. The heat-plastified gel from the extruder is fed into the inlet end of the mixed and discarded from the outlet end, the flow being in a generally axial direction. From the mixer, the gel passes through coolers and from the coolers to a die which extrudes a generally rectangular board. A generally similar extrusion system and a preferred extrusion system is shown in U.S. Pat. No. 3,966,381.

Due to the relatively low solubility of carbon dioxide in polyethylene, the die gap needed for controlled foaming is less than that required with conventional blowing agents, resulting in foams of relatively less thickness. This can be improved by increasing the throughput rate and/or suitable die modifications that reduce the die width for fixed die gaps. Foams of density greater than or equal to about 100 kg/m$^3$ are dimensionally stable (maximum volume change at 23° C. storage is ±5%). However, foams having a density equal to about 65 kg/m$^3$ initially undergo substantial shrinkage (approximately 25–35 volume percent (%)), due to the high permeability of carbon dioxide through polyethylene relative to that of air through polyethylene. Typically, the foams having densities of 65 kg/m$^3$ recover to their original volumes and dimensions after 1 to 2 months storage at room temperature. The recovery can be accelerated if foams are submitted to elevated temperature environments, such as about 60° C.

Generally, the blowing agent is pumped into the heat plastified polyethylene polymer and admixed therewith prior to expansion to form foam. Adequate mixing of the blowing agent into the heat plastified polymer is required in order to obtain a product of desirable uniformity. Such mixing may be accomplished by a variety of means including rotary mixers such as extruders, so-called static mixers or interfacial surface generators, such as are utilized in U.S. Pat. Nos. 3,751,377 and 3,817,669.

In the preparation of foams in accordance with the present invention, it is often desirable to add a nucleating agent to control (i.e., reduce) the cell size. Talc, magnesium oxide, calcium-silicate, calcium stearate, mixtures of citric acid and sodium bicarbonate, and the like are suitable nucleating agents which reduce cell size. Various other additives may be utilized such as, for example, fire retardant chemicals, stabilizers and the like, all of which are commonly used in foam preparation. However, it is not essential to add nucleating agents to the formulation.

The closed cell, low density ethylenic polymer foams prepared in the present invention can be used in numerous applications. Particularly, the closed cell, low density ethylenic polymer foams of the present invention are suitable for use in the fields of cushion packaging, buoyancy applications, construction (thermal/sound/vibration insulation, sealant backers for expansion joints, concrete curing), sports and leisure activities, and the like. In the case of polymer foams which initially shrink substantially, another potential application includes in situ expansion seals in the building industries.

ILLUSTRATIVE EMBODIMENTS

The following examples are given to illustrate the invention and should not be interpreted as limiting it in any way.

Unless stated otherwise, all parts and percentages are given by weight.

EXAMPLES 1–3

Uncrosslinked, closed cell polyethylene foam planks were obtained by feeding uncrosslinked polyethylene polymer having a melt index of 4.2 g/10 min, a melt tension of 5.0 g, and a density of 0.922 g/cm$^3$ to a single screw extruder at a rate of 70 kilogram per hour (kg/h). The formulation was extruded through an adjustable slit die. Carbon dioxide was used as the sole blowing agent at varying rates as indicated in Table I. The properties of the resulting foam planks were evaluated and the results are also given in Table I.

EXAMPLE 4

Example 2 was repeated except for using an uncrosslinked polyethylene polymer having a melt index of 1.75 g/10 min, a melt tension of 3.3 g, and a density of 0.923 g/cm$^3$. The properties of the resulting foam plank were evaluated and the results are given in Table I.

EXAMPLE 5

Example 1 was repeated except for using an uncrosslinked polyethylene polymer having a melt index of 1.8 g/10 min, a melt tension of 8.2 g, and a density of 0.923 g/cm$^3$ at a feed rate of 181.4 kg/h. The properties of the resulting foam plank were evaluated and the results are given in Table I.

EXAMPLES 6 AND 7

Example 5 was repeated except for using an uncrosslinked polyethylene polymer having a melt index of 4.2 g/10 min, a melt tension of 5.1 g, and a density of 0.925 g/cm$^3$. The properties of the resulting foam planks were evaluated and the results are given in Table I.

EXAMPLE 8

Example 6 was repeated except for using an uncrosslinked polyethylene polymer at a feed rate of 4.8 kg/h. The properties of the resulting foam plank were evaluated and the results are given in Table I.

EXAMPLE 9

Example 8 was repeated except for using an uncrosslinked polyethylene polymer having a melt index of 12.0 g/10 min, a melt tension of 2.0 g, and a density of 0.916 g/cm$^3$. The properties of the resulting foam plank were evaluated and the results are given in Table I.

COMPARATIVE EXAMPLE A

The general procedure of Example 8 was repeated except for using an uncrosslinked polyethylene polymer having a melt index of 0.7 g/10 min, a melt tension of 9.8 g, and a density of 0.922 g/cm$^3$. The properties of the resulting foam plane were evaluated and the results are given in Table I.

COMPARATIVE EXAMPLE B

The general procedure of Examples 8 and 9 was repeated except for using an uncrosslinked polyethylene polymer having a melt index of 25.0 g/10 min and a density of 0.925 g/cm$^3$. The melt tension of this polyethylene polymer could not be measured because it was too fluid. The properties of the resulting foam plank were evaluated and the results are given in Table I.

TABLE I

CARBON DIOXIDE AS THE SOLE BLOWING AGENT

|  | Comp. Ex. A* | Ex. 1 | Ex. 2 | Ex. 3 | Ex. 4 |
|---|---|---|---|---|---|
| $CO_2$ rate, php | 2.12 | 1.5 | 2.9 | 3.7 | 2.9 |
| Plank Thickness, mm | 12 | 26 | 17 | 19 | 18 |
| Plank Width, mm | 16 | 142 | 148 | 91 | 144 |
| Density, kg/m3 (fresh) | 465[5] | 105 | 64 | 54 | 69 |
| Density, kg/m3 (after 1 hour) |  | 111 | 67 | 62 | — |
| Density, kg/m3 (after 28 days) | 415 | 112 | 73 | 68 | 78[4] |
| Maximum change in foam volume at 23° C., (%) |  | −2 | −34 | −50 | −14 |
| Time until maximum change[2] |  | 14 | 1 | 2 | 14 |
| Vertical Compressive strength[3], kPa |  |  |  |  |  |
| 10% compression |  | 128 | 37 | 26 | 49 |
| 25% compression |  | 200 | 89 | 63 | 124 |
| 50% compression |  | 313 | 175 | 144 | 214 |

*Not an example of the present invention.
[1]php = parts per hundred of polymer.
[2]days after production at which maximum change in foam volume occurred.
[3]compressive strength after 28 days.
[4]Density, kg/m$^3$ (after 14 days).
[5]Foam collapsed immediately after production and never recovered completely.

|  | Comp. Ex. B* | Ex. 5 | Ex. 6 | Ex. 7 | Ex. 8 | Ex. 9 |
|---|---|---|---|---|---|---|
| $CO_2$ rate, php[1] | 2.0 | 1.43 | 1.4 | 1.8 | 2.0 | 2.0 |
| Plank Thickness, mm | 10 | 38 | 26 | 45.5 | 13 | 11 |
| Plank Width, mm | 23 | 232 | 176 | 166 | 21 | 26 |
| Density, kg/m3 (fresh) | 191[5] | 101 | 104 | 82 | 115 | 97 |
| Density, kg/m3 (after 1 hour) | — | — | — | — | — | — |
| Density, kg/m3 (after 28 days) | 147 | 118 | 111 | 93 | 113[4] | 97[4] |
| Maximum change in foam volume at 23° C., (%) |  | −0.24 | +0.64 | +3.44 | — | — |
| Time until maximum change[2] |  | 7 | 1 | 7 | — | — |
| Vertical Compression strength[3], kPa |  |  |  |  |  |  |
| 10% compression |  | 128 | 166 | 117 | — | — |
| 25% compression |  | 149 | 191 | 151 | — | — |
| 50% compression |  | 252 | 289 | 235 | — | — |

*Not an example of the present invention.
[1]php = parts per hundred of polymer.
[2]days after production at which maximum change in foam volume occurred.
[3]compressive strength after 28 days.
[4]Density, kg/m$^3$ (after 21 days).
[5]Foam collapsed immediately after production and never recovered completely.

As readily apparent from the data shown in Table I, by varying the melt tension properties of the polymer, the foam cross-section, dimensional stabilities and mechanical properties can be significantly changed (compare Examples 2 and 4 as well as Example 5 and 6, at approximately the same fresh density but with polymers of different properties).

EXAMPLE 10

The general procedure of Example 8 was repeated except for using a 60/40 blend of uncrosslinked polyethylene polymer having a melt index of 5.5 g/10 min and 1.8 g/10 min, respectively; melt tension of 5.0 g and 7.5 g, respectively; and densities of 0.916 g/cm$^3$ and 0.923 g/cm$^3$ respectively; and argon as the sole blowing agent. The fresh and aged density of the resulting foam plank was determined and the results are given in Table II.

EXAMPLE 11

The general procedure of Example 10 was repeated except for using an uncrosslinked polyethylene polymer having a melt index of 5.5 g/10 min, a melt tension of 5.0 g, and a density of 0.916 g/cm$^3$. The fresh and aged density of the resulting foam plank was determined and the results are given in Table II.

EXAMPLE 12

The general procedure of Example 10 was repeated except for using a 50/50 blend of polyethylene polymer having a melt index of 5.5 g/10 min and 1.8 g/10 min; melt tension of 5.0 g and 7.5 g, respectively; and densities of 0.916 g/cm$^3$ and 0.923 g/cm$^3$ respectively; and a mixture of argon/$CO_2$ as blowing agent. The properties fresh and aged density of the resulting foam plank was determined and the results are given in Table II.

TABLE II

|  | Ex. or Comp. Ex. | | |
| --- | --- | --- | --- |
|  | 10 | 11 | 12 |
| Density, Kg/m$^3$ (fresh) | 141.0 | 147.4 | 140.1 |
| Density, Kg/m$^3$ (aged) | 142.2 | 150.0 | 131.1 |
| Argon rate, php[1] | 2.0 | 1.7 | 1.0 |
| $CO_2$ rate, php[1] | — | — | 2.0 |

*Not an example of the present invention.
[1]php = parts per hundred of polymer.

As apparent from Table II, argon or mixtures of argon and carbon dioxide also allow for production of uncrosslinked ethylenic polymer foams having densities below 150 kg/m$^3$.

What is claimed is:

1. An uncrosslinked, closed cell, low density ethylenic polymer foam prepared from a foaming composition comprising an uncrosslinked low density ethylenic polymer having a melt index of less than about 25 grams per 10 minutes and a melt tension between about 2.0 grams and about 9.0 g and an inorganic halogen-free blowing agent.

2. An ethylenic polymer foam according to claim 1 wherein the ethylenic polymer has a melt index between about 1.0 g/10 min and about 15 g/10 min and a melt tension between about 3.0 g and about 8.5 g.

3. An ethylenic polymer foam according to claim 1 wherein the ethylenic polymer has a melt index between about 1.5 g/10 min and about 6 g/10 min and a melt tension between about 3.0 g and about 8.0 g.

4. An ethylenic polymer foam according to claim 1 wherein the ethylenic polymer has a density between about 0.916 g/cm$^3$ and about 0.930 g/cm$^3$.

5. An ethylenic polymer foam according to claim 1 wherein the foam cells contain argon when initially formed.

6. An ethylenic polymer foam according to claim 1 wherein the foam cells contain carbon dioxide when initially formed.

7. An ethylenic polymer foam according to claim 1 wherein the foams cells contain a mixture of carbon dioxide and argon when initially formed.

8. An ethylenic polymer foam according to claim 5 wherein the ethylenic polymer is an uncrosslinked, low density polyethylene polymer.

9. An ethylenic polymer foam according to claim 6 wherein the ethylenic polymer is an uncrosslinked, low density polyethylene polymer.

10. An ethylenic polymer foam according to claim 7 wherein the ethylenic polymer is an uncrosslinked, low density polyethylene polymer.

* * * * *